(12) United States Patent
Kalina

(10) Patent No.: US 6,808,680 B2
(45) Date of Patent: Oct. 26, 2004

(54) METHOD OF PREVENTING OR STOPPING SULFURIC CORROSION OF METALS

(76) Inventor: Alexander I. Kalina, 105 Glengarry Way, Hillborough, CA (US) 94010

( * ) Notice: Subject to any disclaimer, the term of this patent is extended or adjusted under 35 U.S.C. 154(b) by 465 days.

(21) Appl. No.: 09/780,489

(22) Filed: Feb. 9, 2001

(65) Prior Publication Data

US 2001/0033938 A1 Oct. 25, 2001

Related U.S. Application Data

(60) Provisional application No. 60/182,082, filed on Feb. 11, 2000.

(51) Int. Cl.[7] ................................................ C23F 11/00
(52) U.S. Cl. .......................... 422/7; 148/214; 148/217; 422/8; 422/15
(58) Field of Search ................... 422/7, 8, 15; 148/214, 148/212

(56) References Cited

U.S. PATENT DOCUMENTS

| | | | | |
|---|---|---|---|---|
| 3,887,488 A | * | 6/1975 | Scott et al. ............... | 252/389.2 |
| 4,026,734 A | | 5/1977 | Manty ................... | 148/6.15 R |
| 4,216,034 A | | 8/1980 | Miyake et al. ............. | 148/20.3 |
| 4,554,090 A | | 11/1985 | Jones .......................... | 252/181 |
| 4,927,519 A | | 5/1990 | Forester | |
| 5,462,634 A | | 10/1995 | Kamiyama et al. ........... | 216/85 |
| 5,500,107 A | | 3/1996 | Edmondson | |
| 6,328,943 B1 | * | 12/2001 | Roling et al. ............... | 423/265 |
| 6,482,272 B2 | * | 11/2002 | Kalina ......................... | 148/214 |

FOREIGN PATENT DOCUMENTS

| | | | |
|---|---|---|---|
| CN | XP002165407 | 12/1984 | |
| DK | 39 17 004 A1 | 11/1989 | ............. C23C/8/04 |
| EP | 0 046 567 A | 3/1982 | ............. C21D/1/76 |
| EP | 0 952 232 A | 10/1999 | ............. C21D/1/76 |
| FR | 76 056 E | 1/1962 | |
| GB | 2 233 672 A | 1/1991 | ............. C23C/8/18 |
| US | PCT/US97/18917 | 10/1997 | ............. C01G/9/12 |

OTHER PUBLICATIONS

International Search Report. Jan. 30, 1998.
Sep. 2, 2001, PCT International Search Report.
XP0010012008, 1977, "Equilibrium surface segregation of dissolved nonmetal atoms on iron (100) faces" article by H.J. Grabke et al. in Surface Science, in Amsterdam, NL.
XP001012213, 1986, "Sulfur effects on the internal carburization of Fe–Ni–Cr alloys" article by J. Barnes et al. in Oxidation of Metals, in Petten, NL.
XP000026509, 1989, "Thermodynamic Control of H2–N2 Bright Annealing Atmospheres to Inhabit Nitrogen Uptake By Stainless Steel" article by Kirner J. F. et al. in Journal of Heat Treating, in New York.

* cited by examiner

*Primary Examiner*—Krisanne Jastrzab
(74) *Attorney, Agent, or Firm*—Robert W. Strozier

(57) ABSTRACT

A method is disclosed for prevention or stoppage of sulfidation or sulfuric corrosion of metal surfaces in contact with fluids including sulfiding compounds, where the method involves the addition of a compound to the fluid, where the additive has a higher affinity for metal surfaces than sulfur. The additive are group 15 of the periodic table of elements, fluorine-containing compounds, or mixtures or combinations thereof and are added in small quantities generally between about 0.001 ppm and about 20 ppm based on the amount of group 15 element or fluorine in the compound used. A protected metal surface is also disclosed which is coated with a protective coating comprising a group 15 element or fluorine and/or sulfur.

8 Claims, 2 Drawing Sheets

METHOD OF PREVENTING OR STOPPING SULFURIC CORROSION OF METALS

RELATED APPLICATIONS

This application claims provisional priority to U.S. Provisional Application Ser. No. 60/182,082 filed Feb. 11, 2000.

BACKGROUND OF THE INVENTION

1. Field of the Invention

The present invention relates to a method for preventing, reducing, stopping and/or arresting sulfuric corrosion of metal surfaces.

More particularly, the present invention relates to a method preventing, reducing, stopping and/or arresting sulfuric corrosion of metal surfaces in contact with fluids that contain agents that cause or promote sulfuric corrosion through addition of a compound having a interaction potential for the metal surface that is greater than the interaction potential for the sulfidizing species in the fluid.

2. Description of the Related Art

Sulfuric corrosion (sulfidation) is quite common in several chemical processes, such as oil and gas processing, combustion of fuels containing sulfur, sulfur production, etc. The usual remedy is to use materials that have a high resistance to sulfidation.

It is well-known that in cases where a gaseous atmosphere containing oxygen, sulfuric corrosion can be ameliorated and slowed by oxidation. In such cases, a layer of oxide forms on the surface of the metal preventing sulfur penetration. Sulfides are formed and deposited on the surface of this oxide layer. The metal surface remains protected during the initial oxidation period, until breakaway corrosion is initiated, which is then followed by rapid sulfidation attack.

Thus, in low oxygen environments, the rate of sulfuric corrosion depends mainly on the materials used and on the concentration of sulfur containing compounds in the contacting fluid or atmosphere. In an environment with sufficient oxygen, corrosion becomes a competition between oxidation and sulfidation.

Thus, it would represent a significant advancement in the art to have a method that prevents sulfuric corrosion of metal surfaces in contact with fluids containing sulfur compounds.

SUMMARY OF THE INVENTION

The present invention provides a method of preventing, reducing, stopping and/or arresting sulfuric corrosion sometimes referred to herein as sulfidation of metal surfaces in contact with fluids containing sulfur containing compounds capable of sulfidizing the metal surfaces. The method comprises adding an anti-sulfidation composition to the fluid on a discrete or continuous basis in an amount sufficient to prevent, reduce or stop sulfidation of the metal surface, where the anti-sulfidation composition comprise a compound that has a greater potential for interacting with the metal surface than the sulfur containing compound and is preferably a phosphorus-containing compound.

The present invention provides a method of preventing sulfuric corrosion of metal surfaces in contact with fluids containing sulfur containing compounds capable of sulfidizing a metal surface, where the method comprises adding a phosphorus-containing compound to the fluid on a discrete or continuous basis in an amount sufficient to prevent, reduce or stop sulfidation of the metal surface.

The present invention also provides an apparatus for introducing an anti-sulfidation composition into processing equipment in contact with fluids containing sulfur containing compounds capable of sulfidizing metal surfaces in an amount sufficient to prevent or to reduce or stop additional sulfidation of the metal surfaces of the equipment. The apparatus includes a reservoir of the composition and an injector system in fluid communication with the reservoir and the equipment for metering into the fluid in contact with the equipment the sufficient amount of the composition. The composition comprises at least one anti-sulfidation composition, where the anti-sulfidation composition is a compound that has a greater potential for interacting with the metal surface than the sulfur containing compound and is preferably a phosphorus-containing compound.

The present invention also provides a metal surface in contact with fluids including sulfur containing compounds capable of sulfidizing a metal surface treated with an anti-sulfidation composition in an amount sufficient to prevent, reduce or stop sulfidation of the metal surface. The composition comprises at least one anti-sulfidation composition, where the anti-sulfidation composition is a compound that has a greater potential for interacting with the metal surface than the sulfur containing compound and is preferably a phosphorus-containing compound.

The present invention also provides a method for preconditioning a metal surface to prevent initial sulfidation including contacting the metal surface with an effective amount of a phosphorus-containing compound sufficient to form a protective phosphorus or phosphorous oxide containing on the metal surface.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
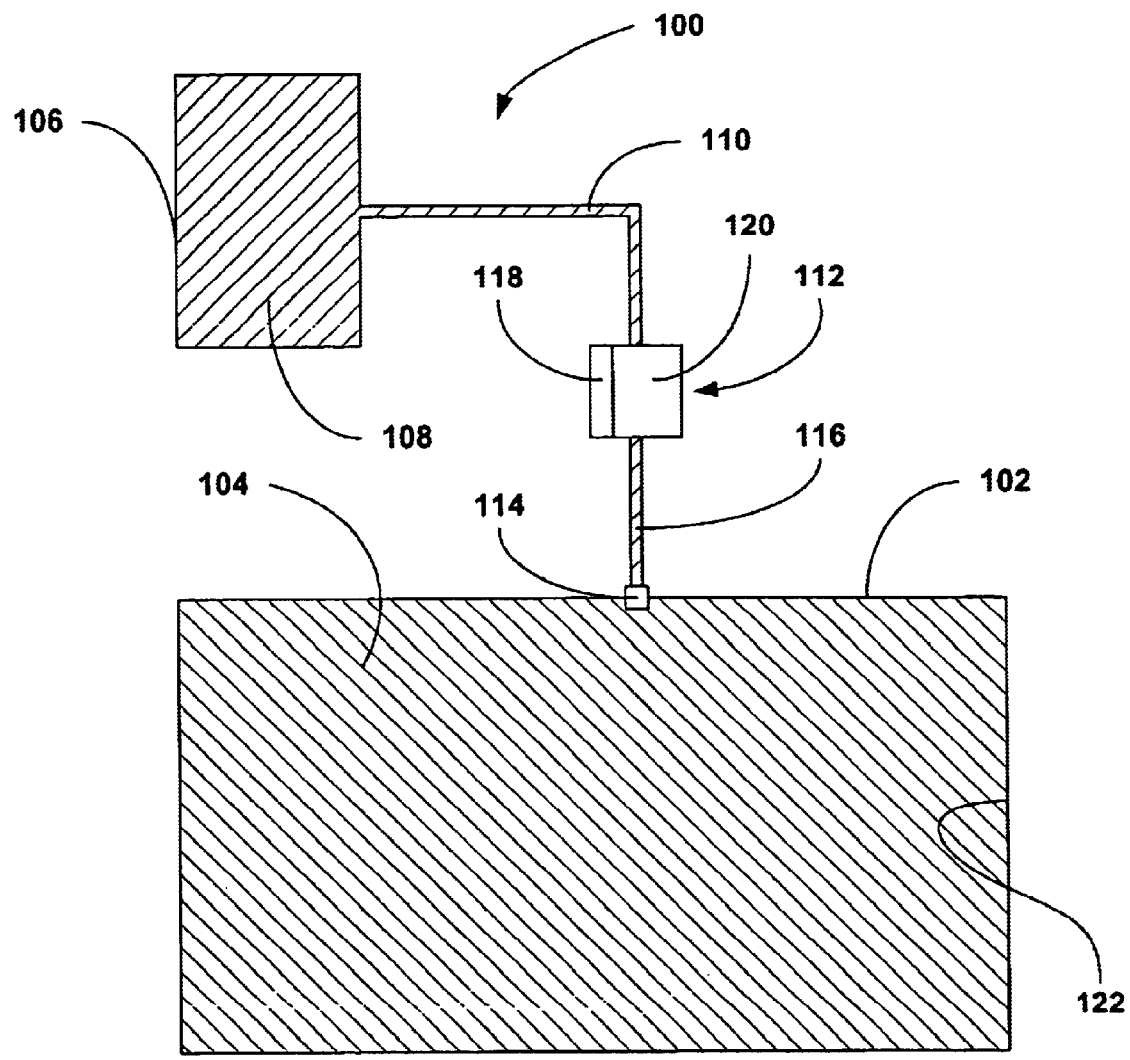
FIG. 1 a schematic block diagram of one embodiment of a system of introducing the anti-sulfidation composition of the present invention into a piece of equipment having interior metal surfaces in contact with fluids including sulfur containing compounds capable of sulfidizing a metal surface.

The inventor has found that sulfidation of metal surfaces in contact with a fluid including sulfur compounds can be prevented or substantially arrested (stopped) by the addition of an anti-sulfidation composition or additive to the fluid, where the additive has a higher affinity for or a more negative enthalpy of formation for interacting with the metal surface than the sulfur-containing compound in the fluid. One such class of anti-sulfidation agents are phosphorus-containing compounds, arsenic-containing compounds, other group 15 (new periodic table notation or group VB old IUPAC notation or group VA CAS notation), fluorine-containing compounds, or mixtures or combinations thereof.

The inventor has experimentally confirmed that the addition of a phosphorus-containing compound to a fluid including hydrogen sulfide in contact with a steel surface substantially prevents sulfuric corrosion of the metal surface. The inventor has also found that the addition of a phosphorus-containing compound to a fluid in contact with a metal surface that has already experienced sulfuric corrosion can substantially arrest or stop further sulfuric corrosion. The term sulfuric corrosion or sulfidation means a corrosive process involving the formation of metal sulfides or subsulfides (non stoichiometrically balanced), a process somewhat similar to oxidation which converts the metal atoms into their corresponding oxides or suboxides.

The inventor has found that the interaction between sulfur and a metal surface or metals in general occurs by at least a two step process. Initially, sulfur is thought to chemisorbed on the surface of the metal forming a partial or complete monolayer on the metal surface. Thereafter, formation of sulfides on the metal surface begins. The enthalpy of formation of such a monolayer is about −190 kJ/mol, whereas the enthalpy of formation of sulfides in the bulk metal is about −100 kJ/mol. See, e.g., J. Benard, J. Oudar, N. Barbouth, E. Margot and Y. Berthier, *Surf Sci.* 1979, 88, L35. Thus, the sulfur potential for the formation of the chemisorbed monolayer, partial or complete, on the metal surface is significantly more energetically favorable than the formation of sulfides in the bulk metal.

The proposed method of preventing sulfuric corrosion or reducing, stopping or arresting further sulfuric corrosion is based on adding to a fluid including a sulfiding agent in contact with a metal surface, a compound having a greater affinity for the metal surface or a higher negative enthalpy of formation than for the formation of a sulfur monolayer. Such compounds can simply be introduced into a working fluid to prevent or stop sulfuric corrosion.

The inventor has found that the addition of such an additive or anti-sulfidation agent to fluids in contact with metal surfaces need be present only in sufficient amount to deactivate certain sites on the metal surface. These sites are the sites responsible for the decomposition of sulfur-containing compounds into atomic sulfur, the formation of a sulfur monolayer (partial or complete) on the metal surface and ultimately the formation of metal sulfides or subsulfides.

Generally, these sites are catalytically active sites for the sulfidation of the metal surface after chemisorption of sulfur compounds has occurred. Preferably, however, the anti-sulfidation agents are added in sufficient amounts to the not only deactivate the sites responsible for monolayer and/or sulfide formation on the metal surface, but in an amount sufficient to interfere with monolayer formation.

If the composition is being added to a surface which has already undergone some degree of sulfidation, the composition should be present in sufficient amounts to prevent or interfere with the further deposition of sulfur on the surface and the concurrent conversion of metal atoms into their corresponding sulfides or subsulfides.

By surface, the inventor means the atoms or sites on the surface and the atoms or sites about 1 to about 50 atomic or molecular layers below the surface. Thus, the sulfiding compounds can react with atoms or sites directly on the surface or near the surface (slightly below the actual surface). An ordinary artisan should recognize that surfaces generally have holes, breaks, cracks, crevices or the like associated therewith and the surface modifying agents would be expected to react anywhere on the surface accessibly to the surface modifying agents. The inventor, therefore, is not limiting the reaction involved sulfidation to atoms or sites forming the interface between the surfaces of an object and its surroundings.

Generally, the phosphorus should be present in small amount regardless of the amount of sulfur in the working fluid. Preferably, this small amount is between about 0.001 ppm and about 20 ppm (by weight). Higher amount are not preferred because too much phosphorus can alter the surface composition of the metal and enhance sulfuric corrosion. Preferably, the phosphorus is present in the fluid between about 0.01 ppm and about 10 ppm and particularly between about 0.01 ppm and about 5 ppm and especially 0.1 ppm to about 2 ppm and most preferred between about 0.1 and about 1 ppm and most especially between about 0.1 and about 0.8 ppm. Of course, the exact amount of a given phosphorus-containing compound used will be that amount necessary to supply the desired amount of phosphorus to the working fluid.

Suitable phosphorus-containing compounds for use in the anti-sulfidation compositions of this invention include, without limitation, phosphorus, phosphines such as $PH_3$, $PRH_2$, $PR_2H$, and $R_3P$ where each R is the same or different and is a C1 to C20 carbon-containing group including alkyl, aryl, alkaryl, aralkyl or the like ($PRH_2$, $PR_2H$, and $R_3P$ compound are sometimes referred hereto as organo-phosphorus compounds), phosphites such as ammonium phosphites, alkali metal phosphites, alkaline metal phosphites, phosphites having organic counter ions, or the like, phosphates such as ammonium phosphates, alkali metal phosphates, alkaline metal phosphates, phosphates having organic counter ions, or the like, pyrophosphates such as ammonium pyrophosphates, alkali metal pyrophosphates, alkaline metal pyrophosphates, pyrophosphates having organic counter ions, or the like, polyphosphates such as ammonium polyphosphates, alkali metal polyphosphates, alkaline metal polyphosphates, polyphosphates having organic counter ions, or the like thiophosphates, thiophoshites or the like or any other phosphorus-containing compounds capable of inhibiting sulfuric corrosion of metal surfaces, or mixtures or combinations thereof. Preferred phosphorus-containing compound are phosphorus oxides including phoshates and phosphorus pentoxide ($P_2O_5$) or phosphorus decoxide ($P_4O_{10}$), with phosphorus pentoxide ($P_2O_5$) or phosphorus decoxide ($P_4O_{10}$) being particularly preferred.

Although phosphorus-containing compounds are preferred for cost, toxicity and availability considerations, arsenic-containing compounds as well as other group 15 elements of the periodic table (antimony-containing compounds, and bismuth-containing compounds) will act as ant-sulfidation agents as well, in addition to combinations or mixtures with and without a phosphorous containing compounds. Additionally, the anti-sulfidation compound can also include fluoride-containing compounds such as fluorine gas, fluorocarbons, fluorides including LiF, NaF, KF, RbF, CsF, $CaF_2$, or the like, fluorates including $SbF_5$, $BF_4$—, $PF_5$ or the like.

Suitable fluids that contact metal surfaces include, without limitation, aqueous fluids (gases or liquids or mixtures thereof) containing sulfiding agents such as single phase solutions containing water and other water miscible solvents containing solutes and sulfiding agents, non-aqueous fluids such as solutions containing non-aqueous solvents or solvent systems including, without limitation, hydrocarbon solvents (alkane, alkene, alkyne, aromatic or non-aromatic ring solvents), alcohol solvents, halogenated solvents, hetero atom containing solvents, or any other solvent or mixed fluids including an aqueous phase and a non-aqueous phase, or mixture or combinations thereof where sulfidation of metals or metal surfaces is a concern.

Of course, the choice of a particular phosphorus-containing compound will depend at least on the metal surface to be protected, the physical conditions associated with the process such as temperature, pressure, etc., the chemical composition of the fluid containing the sulfur-containing compound and the solubility of the compounds in the fluid. For aqueous fluids or mixed fluids, the phosphorus-containing compounds should be soluble enough in the fluid to ensure that a sufficient amount to anti-sulfidation compounds are present in the fluid without precipitation problems. The preferred phosphorus-containing compound is a phosphate.

For non-aqueous environments, the choice of phosphorus compounds will again depend at least on the metal surface to be protected, the physical conditions associated with the process such as temperature, pressure, etc., the chemical composition of the fluid containing the sulfur-containing compound and the solubility of the compounds in the fluid. Again, the preferred phosphorus-containing compound is phosphine ($PH_3$) or lower alkyl phosphines.

Because the method is based on deactivating catalytically active sites on a metal surface responsible for sulfidation, suitable operating temperatures are any temperature at which such a reaction can occur. Generally the temperature can range from near absolute zero on the Kelvin scale to temperatures sufficient to melt the metal surface to be protected. Because the catalytic sites responsible for sulfidation can be activated by means other than temperature (light, radiation, ion and molecular beams or the like), the use of the compositions of the present invention can prevent sulfidation under any of these conditions. If the compositions of the present invention are to be used in a refinery setting, then the temperature range will generally be room temperature or greater. For most refinery reactions the temperature is preferably between about 300° F. and about 2000° F. and particularly between about 300° F. and about 1500° F. and especially between about 300° F. and about 1100° F. For most pipeline applications, the temperature is generally about ambient and will depend on the location of the pipeline, the inherent temperature of the fluid in the pipeline or other factors.

Suitable operating pressures are generally atmospheric pressure (14.67 psia) and above. However, the method of this invention can also be adapted to subatmospheric pressures commonly used in industry. Preferably, the operating pressure is between about 10 mm HG and about 10,000 psia and particularly between about 15 psia (atmospheric pressure) and about 5,000 psia and especially between about 100 psia and about 1,000 psia.

Illustrative examples of the sulfur-containing compounds that can be present in the fluid and which may lead to sulfidation or sulfuric corrosion of the metal surface include, without limitation, sulfur, hydrogen sulfide, sulfide salts such as ammonium sulfide, alkali metal sulfides, alkaline metal sulfides, sulfides having organic counter ions, or the like, thiols—RSH where R is a C1 to C20 carbon-containing group including alkyl, aryl, alkaryl, aralkyl or the like, disulfides—RSSR where each R is the same or different and is a C1 to C20 carbon-containing group including alkyl, aryl, alkaryl, aralkyl or the like, disulfide salts—RSSZ where R is a C1 to C20 carbon-containing group including alkyl, aryl, alkaryl, aralkyl or the like and Z is ammonium, an alkali metal, an alkaline metal or an organic counterion, polysulfides—$RS_iR$ where each R is the same or different and is a C1 to C20 carbon-containing group including alkyl, aryl, alkaryl, aralkyl or the like and i is an integer having a value greater than 2 and generally less than about 20, polysulfide salts—RSiZ where R is a C1 to C20 carbon-containing group including alkyl, aryl, alkaryl, aralkyl or the like, i is an integer having a value greater than 2 and generally less than about 20 and Z is ammonium, an alkali metal, an alkaline metal or an organic counterion or other sulfur compounds capable of sulfidizing a metal surface, or mixtures or combinations thereof.

The present invention also relates to methods for pre-conditioning a metal surface to prevent initial sulfidation including contacting the metal surface with an effective amount of a phosphorus-containing compound sufficient to form a protective phosphorus or phosphorous oxide containing on the metal surface. The method can be accomplished by subliming phosphorus pentoxide ($P_2O_5$) onto the metal surface so that the surface get an amount of phosphorus oxide equal to between about 0.001 ppm and about 2 ppm by weight, preferably, between about 0.01 and about 1 ppm, and particularly about 0.2 to about 1 ppm. For aqueous pre-treating methods, the metal surface is contacted with a solution of phosphates such as ammonium, sodium, potassium phosphate or phosphorus pentoxide in an amount sufficient to deposit amount of phosphorus oxide equal to between about 0.001 ppm and about 2 ppm by weight, preferably, between about 0.01 and about 1 ppm, and particularly about 0.2 to about 1 ppm. For non-aqueous pre-treating methods, the metal surface is contacted with a solution of organically soluble phosphorus containing compounds in an amount sufficient to deposit amount of phosphorus oxide equal to between about 0.001 ppm and about 2 ppm by weight, preferably, between about 0.01 and about 1 ppm, and particularly about 0.2 to about 1 ppm, followed by mild oxidation sufficient to convert the phosphorus-containing compound into phosphorus oxides. Mild oxidation generally means that the phosphorus treated metal surface is exposed to an oxidizing atmosphere for a time and at a temperature and pressure sufficient to convert the organically soluble phosphorus-containing compounds into corresponding oxides. Time and temperature are the controlling factors. Generally, the oxidation can be accomplished in air at ambient temperature to temperature of about 600° C.

EXAMPLES

Example 1

Three tensile specimens made of 12% chromium steel designated samples 1, 2 and 3, respectively, were used in this example to demonstrate the method of the present invention.

Samples 1 and 2 were put in a chamber filled with water vapor (i.e., steam) to which was added 1038 ppm (by weight) of hydrogen sulfide, $H_2S$. This atmosphere also contained between 1 and 2 ppm (by weight) of phosphorus as ammonium phosphate. These specimens were kept in the test chamber for 24 hours at a temperature of 1050° F. and a pressure of 500 psi. Thereafter, sample 1 was removed from the test chamber, and sample 3 was placed in the chamber. Then, the chamber was filled with steam to which was added approximately 1000 ppm (by weight) of $H_2S$ and approximately 300 ppm of phosphorus. Samples 2 and 3 were exposed to this latter atmosphere for 24 hours at 1050° F. and 500 psi.

Samples 2 and 3 were then removed from the test chamber and all three samples were subjected to metallographic and X-ray probe yielding the following results:

Sample 1 showed no trace of any reaction or corrosion. A layer of oxide of approximately 1 micron in thickness was formed. The X-ray probe showed that the concentration of phosphorus on the surface was 2.89 wt. %. No sulfur was detected on the surface.

Sample 2 showed significant pitting and a reactive layer of sulfuric corrosion. The concentration of phosphorus on the surface was about 22.2 wt. %. No sulfur was detected on the surface.

Sample 3 showed a clearly visible reaction layer of sulfuric corrosion. The concentration of phosphorus on the surface was about 8.83 wt. %. The concentration of sulfur on the surface was about 0.64 wt. %.

Example 2

Another tensile specimens made of 12% chromium steel designated sample 4 was used in this example to demonstrate the method of the present invention.

Sample 4 was placed in the test chamber and exposed to a stem atmosphere containing over 3000 ppm of $H_2S$ and between 1 and 2 ppm of phosphorus added as ammonium phosphate. Sample 4 was kept in the test chamber for over 5 days at 1050° F. and 500 psi. After Sample 4 was removed from the test chamber, the sample showed no accumulation of sulfur on the surface. The details of Sample 4 were substantially identical to the details of Sample 1. During this example, a significant quantity of elemental sulfur was produced. The elemental sulfur did not create metal sulfides on the surface of Sample 4, but rather was collected in the filters as a fine powder.

The results of examples 1 and 2 indicate the phosphorus has an affinity to the metal which is several orders of magnitude higher than sulfur. With high concentrations of sulfur, and very small concentrations of phosphorus (1–2 ppm) a co-adsorbed monolayer comprising sulfur and phosphorus is thought to form. This monolayer has a specific property of repelling sulfur and preventing sulfidation or sulfuric corrosion. If and when the quantity of phosphorus in the atmosphere is significantly increased, the protective monolayer is replaced and/or converted to a different surface coating or monolayer, which apparently has a much higher concentration of phosphorus. This new surface coating or modified surface does not protect the metal from sulfuric corrosion and allow sulfur to accumulate on the metal surface. This accumulation is a prerequisite to sulfuric corrosion in an atmosphere containing a significant quantity of oxide (water in this case). Further accumulation of sulfur on the metal surface leads to so called breakaway sulfidation (i.e., sulfuric corrosion).

On the basis of the above data, the inventor concludes that in order to form the protective monolayer, coating or modified metal surface, it is necessary to add or maintain only a very small concentration of phosphorus in the atmosphere or working fluid. As stated previously, this range is preferably between about 0.001 and about 20 ppm. Of course, the exact phosphorus content used in any given condition or environment will depend on the type of metal and on the composition of the working fluid.

DETAILED DESCRIPTION OF THE FIGURES

Figure 2:
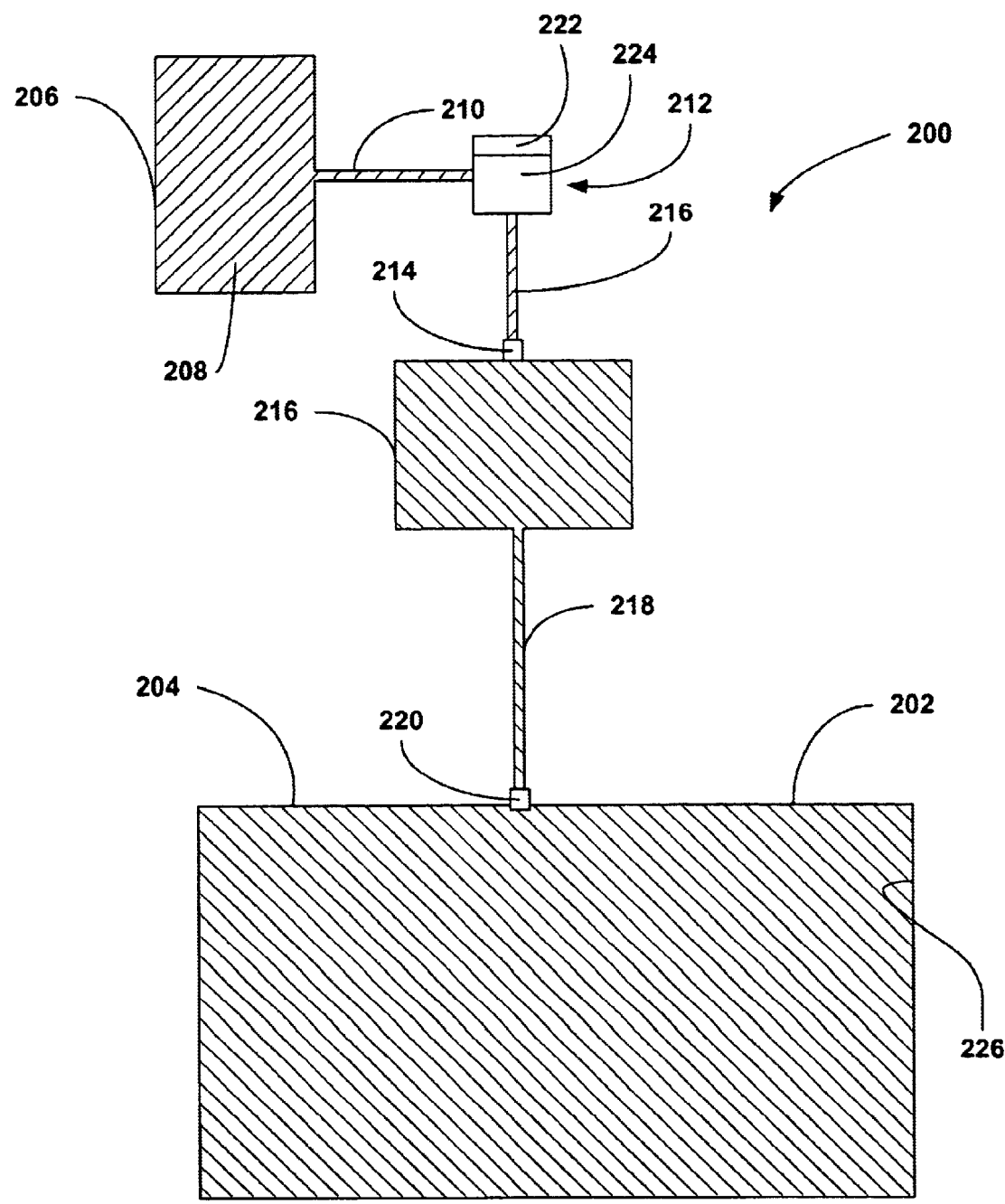
FIG. 2 a schematic block diagram of another embodiment of a system of introducing anti-sulfidation composition of the present invention into a piece of equipment having interior metal surfaces in contact with fluids including sulfur containing compounds capable of sulfidizing a metal surface.

Reference is now drawn to the FIGS. 1–2 which are included for purposes of illustrating apparatuses that can be used to introduce a preventative composition of the present invention and are not meant to be restrictive or limiting as to the scope of this application or the manner in which the compositions of the present invention can be introduced into equipment to be protected against sulfidation.

Referring now to FIG. 1, a system, generally 100 is shown for introducing anti-sulfidation composition of the present invention into a closed metal vessel 102 containing a fluid containing a sulfiding compound 104. The system includes a reservoir 106 containing an anti-sulfidation composition 108 of the present invention, a conduit 110 connecting the reservoir 106 to a metering unit 112 connected to an inlet valve 114 attached to the vessel 102 by a second conduit 116. The metering unit 112 includes a controller 118 and a pump 120 (as is well-known in the art), which injects the anti-sulfidation composition 108 under controlled conditions into the vessel 102 at a rate sufficient to maintain a concentration of the anti-sulfidation composition 108 in the fluid 104 sufficient to reduce, prevent, arrest or stop sulfidation of interior surfaces 122 of the vessel.

Referring now to FIG. 2, another system, generally 200 is shown for introducing an anti-sulfidation composition of the present invention into a closed metal vessel 202 containing a fluid containing a sulfiding compound 204. The system includes a reservoir 206 containing an anti-sulfidation composition 208 of the present invention, a conduit 210 connecting the reservoir 206 to a metering unit 212 connected to an inlet valve 214 attached to a fluid reservoir 216, which is in turn connected by a second conduit 218 to a valve 220 attached to the vessel 202. The metering unit 212 includes a controller 222 and a pump 224 which injects the anti-sulfidation composition 208 under controlled conditions into the fluid reservoir 216 at a rate sufficient to maintain a concentration of the anti-sulfidation composition 208 in the fluid 204 sufficient to reduce, prevent, arrest or stop sulfidation of interior surfaces 226 of the vessel.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method of prevention sulfidation of metals comprising the steps of:

adding to a fluid including a sulfiding compound an effective amount of a preventative composition, where the composition reduces or prevents sulfidation by deactivating metal sites involved in the formation of atomic sulfur and/or sulfides at or on a surface of the metal and where the effective amount of the preventative composition is between about 0.2 ppm and about 0.8 ppm.

2. A method of stopping sulfidation of metals comprising the steps of:

adding to a fluid including a sulfiding compound an effective amount of a preventative composition, where the composition stops or arrests further sulfidation of the metal by deactivating metal sites involved in the formation of atomic sulfur and/or sulfides at or on a surface of the metal and where the effective amount of the preventative composition is between about 0.2 ppm and about 0.8 ppm.

3. The method of claims 1–2, wherein the composition comprises a compound having a higher affinity for the metal surface than the sulfiding compound.

4. The method of claims 1–2, wherein the composition comprises an effective amount of a phosphorus in the form of a phosphorus-containing compound to reduce sulfidation of the metal.

5. The method of claim 4, wherein the phosphorus-containing compound comprises phosphorus, phosphines of formulas $PH_3$, $PRH_2$, $PR_2H$, and $R_3P$ where each R is the same or different and is a C1 to C20 carbon-containing group including alkyl, aryl, alkaryl or aralkyl; phosphites including ammonium phosphites; alkali metal phosphites; alkaline metal phosphites; phosphites having organic counter ions; phosphates including ammonium phosphates; alkali metal phosphates; alkaline metal phosphates; p hosphates having organic counter ions; pyrophosphates including ammonium pyrophosphates; alkali metal pyrophosphates; alkaline metal pyrophosphates; pyrophosphates having organic counter ions; polyphosphates including ammonium polyphosphates; alkali metal polyphosphates; alkaline metal polyphosphates; polyphosphates having organic counter ions; thiophosphates; thiophoshites; or other phosphorus-containing compounds capable of inhibiting sulfuric corrosion of metal surfaces, or mixtures or combinations thereof.

6. A method of pre-treating metal surfaces comprising the steps of:

contacting a metal surface with an effective amount of a pre-treating composition sufficient to deposit onto the metal surface a protective coating, where the coating prevents or reduces sulfidation of the metal by deactivating metal sites involved in the formation of atomic sulfur and/or sulfides at or on the surface, where the effective amount of the preventative composition is between about 0.2 ppm and about 0.8 ppm.

7. The method claim 6, wherein the pre-treating composition comprises an organo-phosphorus compound and the method further comprising the step of:

oxidizing the organo-phosphorus compound to a phosphorus oxide compound.

8. The method claims 6, wherein the phosphorus-containing compound comprises phosphorus, phosphines of formulas $PH_3$, $PRH_2$, $PR_2H$, and $R_3P$ where each R is the same or different and is a C1 to C20 carbon-containing group including alkyl, aryl, alkaryl or aralkyl; phosphites including ammonium phosphites; alkali metal phosphites; alkaline metal phosphites; phosphites having organic counter ions; phosphates including ammonium phosphates; alkali metal phosphates; alkaline metal phosphates; phosphates having organic counter ions; pyrophosphates including ammonium pyrophosphates; alkali metal pyrophosphates; alkaline metal pyrophosphates; pyrophosphates having organic counter ions; polyphosphates including ammonium polyphosphates; alkali metal polyphosphates; alkaline metal polyphosphates; polyphosphates having organic counter ions; thiophosphates; thiophoshites; or other phosphorus-containing compounds capable of inhibiting sulfuric corrosion of metal surfaces, or mixtures or combinations thereof.

* * * * *